June 17, 1952  M. SHAPIRO  2,600,929
MACHINE DRIVE
Filed March 24, 1949  2 SHEETS—SHEET 1
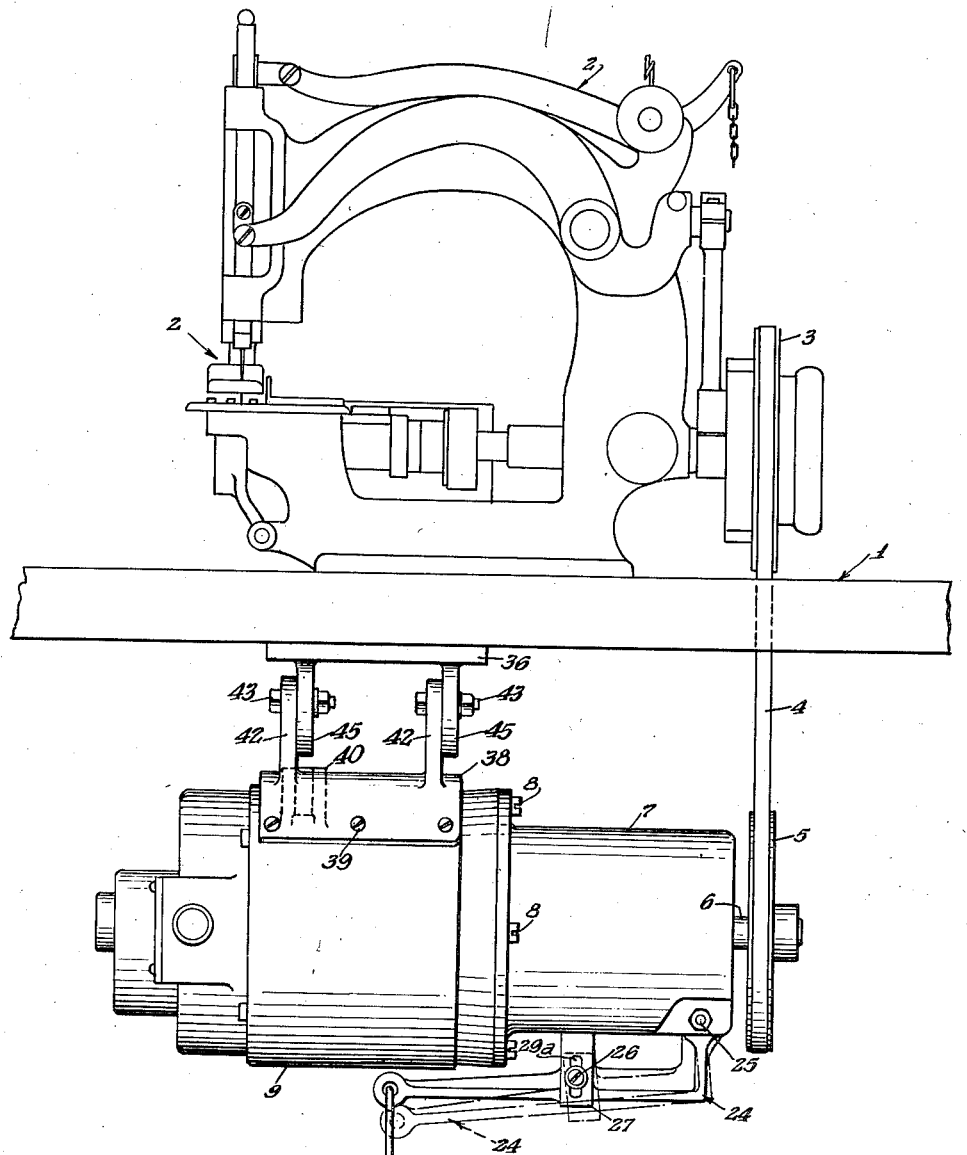
FIG. 1.
INVENTOR.
MORDECAI SHAPIRO
BY 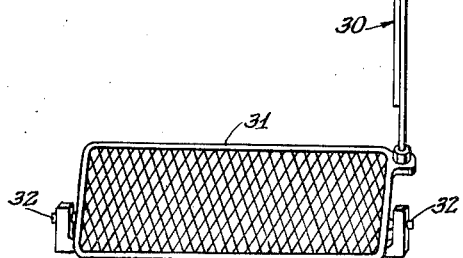
ATTORNEYS

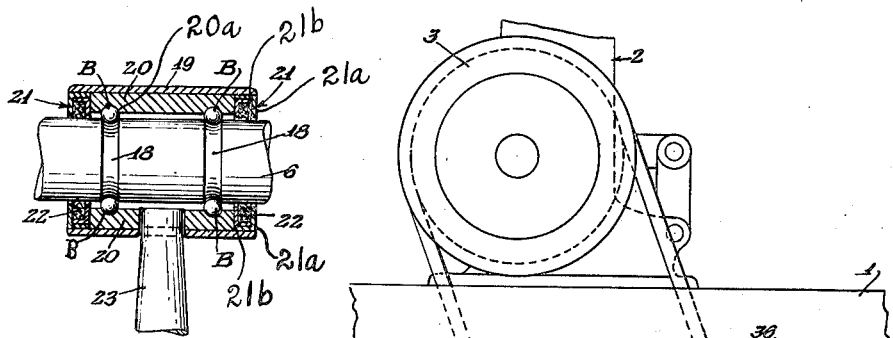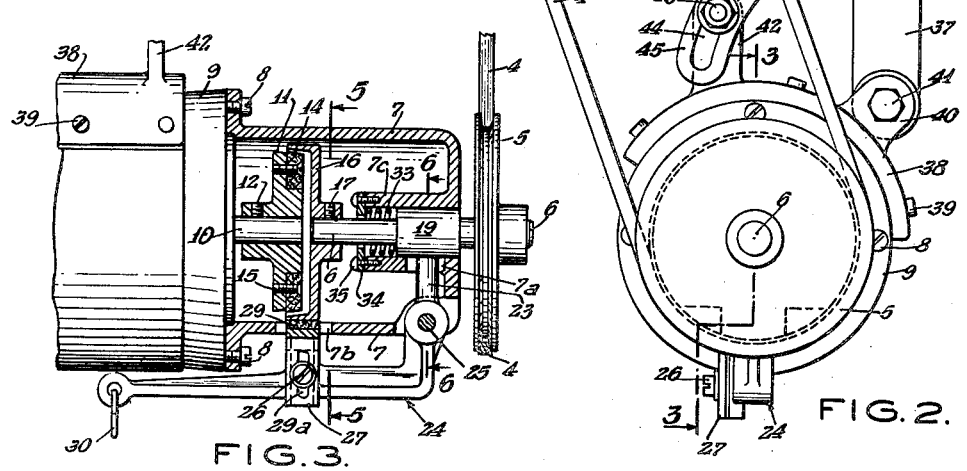

Patented June 17, 1952

2,600,929

UNITED STATES PATENT OFFICE 2,600,929

MACHINE DRIVE

Mordecai Shapiro, Merrick, N. Y.

Application March 24, 1949, Serial No. 83,221

3 Claims. (Cl. 308—187.1)

My invention relates to a new and improved drive for machines, such as sewing machines and other machines.

It is well-known to provide alined driving and driven shafts which have respective coupling members or clutch members fixed respectively thereto, and to move the driven shaft axially relative to the driving shaft, in order to connect said driven shaft operatively to said driving shaft or to disconnect said driven shaft from said driving shaft.

According to one embodiment of my invention, I provide the periphery of the driven shaft with two continuous and circumferential grooves which are spaced axially from each other, so that said periphery operates as the inner race of a ball-bearing. I provide the internal periphery of the outer race with two continuous and circumferential grooves, each of which is opposite a respective groove of the inner race. A part of each ball is located in a groove of the inner race, and a part of each ball is located in the corresponding groove of the outer race.

This outer race, which does not rotate with the driven shaft, preferably has an external cylindrical periphery, and it fits closely and axially slidably in an external guide. I apply the axial force directly to said outer race, in order to shift the driven shaft axially between its connected and disconnected positions. I thus provide a device in which the anti-friction bearing provides an axial thrust member for shifting the driven shaft axially from one position to the other.

I prefer to locate the outer race in an outer sleeve-housing, which has end-portions which extend axially beyond the race, and to provide said end-portions of said sleeve-housing with respective oil-seals, so that the bearing can always be filled with lubricating oil.

Other objects and advantages of my invention are disclosed in the annexed description and drawings, which illustrate a preferred embodiment thereof.

Fig. 1 is a side elevation, which shows the improved drive in association with a sewing machine;

Fig. 2 is an end view, taken at the right of Fig. 1;

Fig. 3 is a section on the line 3—3 of Fig. 2, showing the driven shaft uncoupled from the driving shaft, and showing the brake in operative position;

Fig. 4 is similar to Fig. 3, showing the driven shaft coupled to the driving shaft, and showing the brake in non-operative position;

Figs. 5 and 6 are respective sections on the lines 5—5 and 6—6 of Fig. 3; and

Fig. 7 is a detail sectional view of the improved anti-friction bearing.

Fig. 1 shows a table 1, to which for example, a sewing machine 2 is fixed. This sewing machine 2 is provided with the usual drive pulley 3, which is connected by a belt 4 to a pulley 5 which is fixed to a driven shaft 6 of the drive mechanism or drive unit. This drive unit is enclosed in a casing 7. This casing 7 is affixed by means of fastening members 8 to the casing 9 of a driving motor.

Fig. 3 shows a part of the driving shaft 10 of said motor. A driving rotor 11 is fixed detachably to the shaft 10 by one or more set screws 12. A friction member 14, of frusto-conical shape, is fixed detachably to the rotor 11 by means of fastening members 15. A hollow driven rotor 16 is detachably fixed to the driven shaft 6, by one or more set screws 17. The shafts 10 and 6 are coaxial. Shaft 6 is axially movable relative to shaft 10.

These rotors 11 and 16 exemplify conventional clutch or coupling members, to which the invention is not limited, as I can use any type of clutch means or coupling means.

As shown in Fig. 7, the driven shaft 6 is provided with two circumferential and continuous grooves 18, which are in planes which are perpendicular to the common axis of shafts 10 and 6. The periphery of shaft 6 provides the inner race of an antifriction bearing, which comprises also an outer sleeve-race 20, which is fixed either permanently or releasably to sleeve housing 19, so that outer sleeve-race 20 and sleeve housing 19 rotate in unison, and also move axially in unison. In effect, the sleeve housing 19 is a part of outer sleeve-race 20. Said sleeve 19 extends axially beyond race 20 to provide end-extensions of the race.

In this embodiment, the inner periphery of outer sleeve-race 20 is a cylinder. This is provided with two internal circumferential and continuous grooves 20a, which are in planes which are perpendicular to the axis of sleeve-race 20.

Each groove 18 is associated with a respective set or series of anti-friction balls B. Each ball B is located partially in a respective groove 18. Each ball B interfits rotatably with the wall of its respective groove 18. The set or series of anti-friction balls B associated with each groove 18 is also associated with a groove 20a. Each ball B is located partially in a respective groove 20a. Each ball B interfits rotatably with the wall of its respective groove 20a.

The sleeve-housing 19 and the race 20 may be resilient, so that they can be easily assembled by means of a frictional drive-fit. The assembly of sleeve-housing 19 and race 20 may also be resilient, so that the balls B can be easily forced into the final assembled position of Fig. 7. Also, the race 20 may consist of two longitudinal half-parts, which may be fixed to each other detachably.

A substantial part of each ball B is located in its respective grooves 18 and 20a, so that race 20 and shaft 6 move axially in unison under the operating conditions. If desired, the end-portions of race 20 may be provided with one or more axial slits, in order to increase their radial flexibility.

In an ordinary drive for a sewing machine, which requires low driving force, many of these features are not required. In such case, and as one example, the diameter of balls B is $\frac{3}{16}$ of an inch, the depth of each groove 18 is $\frac{1}{16}$ of an inch, the clearance between race 20 and shaft 6 is $\frac{1}{16}$ of an inch, and the depth of each groove 20a is $\frac{1}{16}$ of an inch. In such case, the thickness of race 20 is $\frac{1}{4}$ of an inch, and the thickness of sleeve-housing 19 is $\frac{3}{32}$ of an inch. The race 20 is made of hardened steel and the sleeve 19 is made of hardened steel.

In such case, the race 20 and the sleeve-housing 19 may be initially assembled by friction as a sub-unit, which is then easily assembled with balls B, because this sub-unit has sufficient radial flexibility without providing any axial slit or slits in the end-portions of race 20.

The sleeve 19, which may optionally be omitted, is used because it has end-portions which extend axially beyond the race 20, thus providing means for assembly with the outer angular members 21a and the inner angular members 21b of respective channels 21. These angular members 21a and 21b are spaced slightly from shaft 6.

Each outer angular member 21a has a cylindrical flange which has a tight friction fit in sleeve-housing 19, and a planar radial flange The edge of each said cylindrical flange abuts the respective end-wall of race 20.

Each said inner angular member 21b has a cylindrical flange which has a tight friction fit in the cylindrical flange of the respective outer angular member 21a. The edge of the cylindrical flange of each inner angular member 21b optionally abuts the planar radial flange of the respective outer angular member 21a. Each said inner angular member 21b has a radial planar flange which abuts the respective end-wall of race 20.

A resilient and flexible and compressible sealing gasket 22, which is made of impregnated felt or other suitable material, is held in each channel 21, in order to provide an oil seal. In the final assembly, each gasket 22 abuts the shaft 6 under slight compression.

The angular members 21a and 21b and their respective sealing gaskets 22 may be assembled as respective sub-units, which can be pushed into assembled position. I can thus provide a filling of lubricating oil in the anti-friction bearing. Each channel 21 and its gasket 22 can be removed, in order to replenish this oil filling.

The cylindrical sleeve housing 19 fits closely and slidably in a cylindrical recess of casing 7. Said recess has a cylindrical wall 7c, which has a bottom axial slot or opening 7a.

A lever 24 is pivoted by a pivot pin 25 to the walls of a slot in casing 7. Said lever 24 has an arm 23 which extends through said slot of casing 7 and through the slot or opening 7a. When the driven shaft 6 is uncoupled from driving shaft 10, as illustrated in Fig. 3, said arm 23 abuts sleeve housing 19, and said arm 23 is vertical. This arm 23 may be resilient and compressible. When arm 23 is in its position of Fig. 3, the tip of arm 23 may be slightly spaced from sleeve-housing 19.

When lever 24 is turned from the position of Fig. 3 to the position of Fig. 4, the arm 23 frictionally forces sleeve housing 19 axially towards driven shaft 10, thus forcing driven shaft 6 and its coupling member 16 to the coupling position shown in Fig. 4 by means of outer-sleeve race 20 and balls B, thus rotating driven shaft 6 while the outer sleeve-race 20 and sleeve-housing 19 are held against rotation by the friction of arm 23. The inner face of arm 23 may be provided with a resilient and compressible friction strip, in order to provide the frictional thrust.

The sleeve housing 19 and lever 24 are normally maintained in their respective positions of Fig. 3 by a compression spring 33. One end of compression spring 33 abuts sleeve-housing 19. The other end of compression spring 33 abuts a plate 34 which is fixed to the inner end-face of wall 7c by screws 35.

One end of lever 24 is connected by a double, adjustable rod assembly 30, or other connecting member, to a grilled treadle 31, which is pivoted by a pivot pin 32 to a fixed base.

A plate 27 has a slot 29a. Said plate 27 is fixed adjustably to lever 24 by a clamping screw 26, whose shank extends through slot 29a.

Plate 27 has a brake-shoe 28, which is provided with a brake-strip 29. Said plate 27 is movable through a slot or opening 7b of casing 7.

When lever 24 is turned to the position of Fig. 4, the brake is released from the driven coupling member 16. When lever 24 is in its normal position of Fig. 3, the brake is applied to coupling member 16.

Fig. 2 also shows means for tightening the drive belt 4 between the driven pulley 3 and the drive pulley 5.

A bracket 36 is fixed to the inner side of the table 1. This bracket 36 has a depending arm 37. A part-cylindrical flange 38 is detachably fixed to the exterior of the motor casing 9 by fastening members 39. This flange 38 has a pair of lugs 40, between which the depending arm 37 is located. The lugs 40 are adjustably connected to the arm 37, by means of the pivot bolt or pivot clamping screw 41 which can be tightened, in order to clamp the lugs 40 and arm 37 to each other in adjusted position. Said flange 38 has a pair of spaced arms 42. A clamping screw 43 is connected to each arm 42. Each clamping screw 43 has a shank which extends through the curved slot 44 of a respective arm 45 which is integral with the bracket 36. The motor housing 9 can therefore be securely clamped in adjusted position, at which the belt 4 is under proper tension.

The invention is not restricted to any type of anti-friction member, or to a solid shaft which extends through an external hollow race. The invention also includes the sub-combinations disclosed herein.

I have disclosed a preferred illustrative embodiment of my invention, but numerous changes and omissions and additions can be made without departing from its scope.

I claim:

1. In combination, a rotatable shaft which has an outer periphery which has two circumferential and continuous shaft grooves, said shaft grooves being located in planes which are perpendicular to the axis of rotation of said shaft, a hollow external race through which said shaft extends axially, said race having a cylindrical inner periphery, said race having two internal circumferential and continuous race-grooves, said race-grooves being located in planes which are perpendicular to the axis of rotation of said race, each of said race-grooves opposing and being paired with a respective shaft groove, a set of rotatable anti-friction members associated with each said pair of grooves, a part of each of said anti-friction members being located in its respective shaft groove, a part of each of said anti-friction members being located in its respective race-groove, said anti-friction members interfitting rotatably with the walls of said shaft grooves and with the walls of said race-grooves, said shaft being movable to and fro in the direction of said axis in unison with said hollow external race and said sets of anti-friction members.

2. A rotatable shaft which has an outer periphery which has two circumferential and continuous shaft grooves, said shaft grooves being located in planes which are perpendicular to the axis of rotation of said shaft, a hollow external race through which said shaft extends axially, said race having a cylindrical inner periphery, said race having two internal circumferential and continuous race-grooves, said race-grooves being located in planes which are perpendicular to the axis of rotation of said race, each of said race-grooves opposing and being paired with a respective shaft groove, a set of rotatable anti-friction members associated with each said pair of grooves, a part of each of said anti-friction members being located in its respective shaft groove, a part of each of said anti-friction members being located in its respective race-groove, said anti-friction members interfitting rotatably with the walls of said shaft grooves and with the walls of said race-grooves, said race having end-extensions, and an oil seal located in each of said end-extensions, each oil seal comprising a pair of angle members which constitute a channel, the angle member of each pair interfitting with each other and abutting a respective shoulder, each said channel having a sealing gasket located therein, each said sealing gasket extending radially beyond the respective channel and abutting the outer periphery of said shaft.

3. A combination according to claim 1, said race being sufficiently resilient to snap said anti-friction members into their aforesaid positions when said race-grooves are respectively alined with said shaft grooves.

MORDECAI SHAPIRO.

REFERENCES CITED

The following references are of record in the file of this patent:

UNITED STATES PATENTS

| Number | Name | Date |
|---|---|---|
| 365,439 | Kasey | June 28, 1887 |
| 668,166 | Diehl et al. | Feb. 19, 1901 |
| 1,403,367 | Whitney | Jan. 10, 1922 |
| 1,462,046 | Reddig | July 17, 1923 |
| 1,536,339 | Gunn | May 5, 1925 |
| 1,670,661 | Holtschmit | May 22, 1928 |
| 1,687,778 | Morris | Oct. 16, 1928 |
| 1,850,800 | Langston et al. | Mar. 22, 1932 |
| 1,866,046 | Lemieux | July 5, 1932 |
| 1,926,999 | Keller | Sept. 12, 1933 |
| 2,187,968 | Friedman | Jan. 23, 1940 |
| 2,199,090 | Palmer | Apr. 30, 1940 |
| 2,380,971 | Knox | Aug. 7, 1945 |
| 2,544,763 | Schulder | Mar. 13, 1951 |